United States Patent [19]
Lohaus et al.

[11] Patent Number: 5,976,020
[45] Date of Patent: Nov. 2, 1999

[54] TORSIONAL VIBRATION DAMPER WITH ROLLING BODIES AS COUPLING

[75] Inventors: Norbert Lohaus, Schweinfurt; Jörg Sudau, Niederwerrn, both of Germany

[73] Assignee: Mannesmann Sachs AG, Schweinfurt, Germany

[21] Appl. No.: 08/923,154

[22] Filed: Sep. 4, 1997

[30] Foreign Application Priority Data

| Sep. 4, 1996 | [DE] | Germany | 196 35 797 |
| Jun. 12, 1997 | [DE] | Germany | 296 22 934 |
| Jun. 23, 1997 | [DE] | Germany | 197 26 532 |

[51] Int. Cl.⁶ ......................... F16D 3/00
[52] U.S. Cl. .................. 464/3; 192/30 V; 74/574
[58] Field of Search ............ 464/1, 3; 192/30 V, 192/201; 74/574

[56] References Cited

U.S. PATENT DOCUMENTS

| Re. 20,773 | 6/1938 | Sarazin | 74/574 |
| 2,029,796 | 2/1936 | Salomon | 74/574 |
| 2,079,226 | 5/1937 | Sarazin | 74/574 |
| 2,103,643 | 12/1937 | Salomon | 74/574 |
| 2,346,972 | 4/1944 | Kishline | 74/574 |
| 2,653,457 | 9/1953 | Guernsey et al. | 74/574 |
| 2,667,049 | 1/1954 | Guernsey et al. | 464/3 |
| 4,485,906 | 12/1984 | Lutz et al. | 74/574 |
| 4,800,996 | 1/1989 | Loizen | 192/201 |
| 5,351,574 | 10/1994 | Hiraishi et al. | 74/574 |
| 5,520,271 | 5/1996 | Kohno et al. | 192/30 V |
| 5,819,598 | 10/1998 | Cooke et al. | 192/30 V |

*Primary Examiner*—Eileen Dunn Lillis
*Attorney, Agent, or Firm*—Cohen, Pontani, Lieberman & Pavane

[57] ABSTRACT

A torsional vibration damper has a transmission element on the drive side and a transmission element on the driven side which is rotatable relative to the drive-side transmission element against the action of a damping device. The damping device serves to transmit torque between the two transmission elements and has at least one coupling body that moves along at least one guide path which is formed in one of the transmission elements. This coupling body is displaceable at least in the circumferential direction and is in a working connection with the other transmission element via a driver device so that a deflection of one of the transmission elements in the circumferential direction by a relative movement of the coupling body results in a deflection of the other transmission element. Each guide path is provided with a curvature having a curvature location at the maximum distance from the axis of rotation. The coupling body is preferably constructed with its own curvature at least along its rolling region facing the guide path, wherein the coupling body has a projection extending in the direction of a transmission element having a driver device. The projection engages in a material cut out portion of the driver device at the corresponding transmission element and is guided in this material cut out portion so that the material cut out portion allows movement of the coupling body substantially in the radial direction, but enables a maximum movement in the circumferential direction within the framework of a predeterminable angle.

22 Claims, 10 Drawing Sheets

TORSIONAL VIBRATION DAMPER WITH ROLLING BODIES AS COUPLING

BACKGROUND OF THE INVENTION

1. Field of the Invention

The invention relates to a torsional vibration damper with rolling bodies as coupling elements.

2. Description of the Prior Art

German reference DE 41 28 868 discloses a torsional vibration damper having a transmission element on the drive side and a transmission element on the driven side which is rotatable relative to the drive-side transmission element against the action of a damping device. The damping device serves to transmit torque between the two transmission elements. The damping device has springs which are guided along a guide path via slide blocks and which serve as displaceable coupling bodies. A plurality of these springs are combined in a spring set which is in a working connection with one of the transmission elements at one end and with the other transmission element at the other end so that a deflection of one of the transmission elements in the circumferential direction by a relative movement of the coupling body results in a deflection of the other transmission element. Every coupling body is arranged in a recess of one of the transmission elements, which recess has the guide path, and is connected with a driver device of the other transmission element. The driver device is formed by the control element acting on the spring set.

Torsional vibration dampers according to the German reference mentioned above are suitable for filtering a complete frequency range, that is, for damping amplitudes of different orders. However, particularly disruptive amplitudes of a certain order cannot be effectively suppressed in a manner that is often required or desired.

By constructing the coupling bodies as springs, it is ensured that the two transmission elements will be moved back into their initial position after every relative deflection brought about by a torsional vibration. Thus, the two transmission elements have an exactly defined reference position relative to one another in the unloaded state. However, a disadvantage of such coupling bodies is that the inertia which the corresponding transmission element sets in opposition to an introduced torsional vibration is not changeable. Furthermore, the constructional configuration of such a torsional vibration damper is relatively complicated, since control elements must be provided for the springs at both flywheel masses, the springs acting between these control elements.

A transmission element in the form of a flywheel mass is known from U.S. Pat. No. 5,295,411, in which a circular compensating flywheel mass is received in each of a plurality of circular cavities. The diameter of the compensating flywheel mass is smaller than that of the cavity. A flywheel mass of this type is commonly referred to as "Salomon-Tilger" and has the advantage that the compensating flywheel masses are dependent on changes in speed at the flywheel mass with respect to their deflection speed. With a flywheel mass of this kind, torsional vibrations of a determined order, preferably of the second order in four-cylinder internal combustion engines, can be advantageously reduced by a determined amount at defined amplitude values. However, it is not possible to influence vibrations of another order.

U.S. Pat. No. 2,205,401 discloses a compensator in which a flywheel mass, having a guide path for compensator masses which are in a working connection with an actuating or adjusting device, is fastened to a drive, for example, a crankshaft. The compensator masses, as well as the guide path associated therewith, have a curvature, preferably in a circular shape, wherein the radius of curvature of the compensator masses is smaller than that of the associated guide paths so as to enable a rolling movement of the compensator masses in the guide paths when torsional vibrations are introduced via the flywheel mass. The reason for the existence of a plurality of guide paths and the adjusting device mentioned above is so that the compensator masses can be brought, during an adjusting process by the adjusting device, into the respective guide path required for compensating for a torsional vibration of a determined order occurring precisely at that time. Accordingly, in contrast to the compensator discussed above in connection with U.S. Pat. No. 5,295,411, not only one order but a plurality of orders can be reduced by a determined amount. Nevertheless, there is again no possibility of influencing torsional vibrations of other orders.

SUMMARY OF THE INVENTION

The object of the present invention is to provide a torsional vibration damper that filters out the torsional vibrations generated by a drive such as an internal combustion engine, for example, as far as possible, using the most economical possible design.

Pursuant to this object, and others which will become apparent hereafter, one aspect of the present invention resides in a torsional vibration damper comprising a drive-side transmission element, a driven-side transmission element, and a damping device arranged to transmit torque between the transmission elements. The driven-side transmission element is rotatable about an axis of rotation relative to the drive-side transmission element against action of the damping device. The damping device includes at least one coupling body that moves along at least one guide path formed in one of the transmission elements. The at least one guide path is configured to have a curvature with a position or location along the curvature that is at a maximum distance from the axis of rotation. The coupling body is displaceable in a circumferential direction, in working condition with the other transmission element and has a rolling region with a curvature that faces the guide path. A driver device is provided to connect the coupling body with the other transmission element so that deflection of one transmission element in a circumferential direction by relative movement of the coupling body results in a deflection of the other transmission element. The driver device has a material cut out portion and the coupling body has a projection that extends toward the transmission element having the driver device and engages in the cut out portion so as to be guided thereby so that the cut out out portion allows the coupling body to move in a substantially radial direction and enables a maximum movement in the circumferential direction with a predeterminable angle.

The construction of the torsional vibration damper with a guide path for a coupling body and with the coupling bodies themselves has the following results. As soon as the torsional vibration damper is set in rotation about its axis of rotation, the coupling body is pushed radially outward by the centrifugal force within a recess receiving the coupling body, which recess can be provided, for example, in one of the transmission elements, and comes to a stop in a position in which the curvature location of the guide path is at a maximum distance from the axis of rotation. A further increase in speed no longer results in a change in position of the coupling body, but nevertheless, due to the further increase in centrifugal force, causes an elevated area pressure between the coupling body and the guide path. When torsional vibrations and/or torque are introduced from the drive-side transmission element to the driven-side transmission element, the coupling body tends, because of its inertia, to detach itself from its above-described position by means of a rolling or sliding process on the guide path, specifically in such a way that it is deflected in the direction opposite to the acceleration direction of the transmission element receiving it, wherein the extent of deflection depends on the magnitude of the torsional vibration or torque. This deflection thus acts in the direction opposite to the radially outwardly directed centrifugal force, namely, more significantly as the speed of the torsional vibration damper increases. To this extent, a speed-dependent behavior of the coupling body results in that a deflection of this coupling body due to torsional vibration becomes increasingly difficult as the speed of the torsional vibration damper increases. Thus, the behavior of the coupling body corresponds to that of a spring in which the stiffness would increase as the speed increases.

As a result of the coupling body being received at the other transmission element so that it is movable in the radial direction, but fixed in the circumferential direction, the driven-side transmission element is carried along when a torsional vibration is introduced to the drive-side transmission element. In this respect, the coupling body acts as a coupling element between the two transmission elements and accordingly fulfills the task which in the prior art is fulfilled by springs, but, beyond this, also provides the advantage, due to its rolling or sliding movement along the guide path, that it increases the inertia of the drive-side transmission element when a torsional vibration is introduced. Because of this, the coupling body in the proposed torsional vibration damper acts not only as a coupling element in the manner of the aforementioned springs, but also acts as a compensating flywheel mass of a compensator element as in the case of the Salomon-Tilger compensator, for example. Insofar as the damping of torsional vibrations is concerned, this results in excellent characteristics together with a particularly economical construction, since, understandably, such a coupling body is substantially simpler to produce than a spring oriented in the circumferential direction. According to another embodiment of the invention, the degree of curvature of the rolling or sliding region of the coupling body is substantially greater than that of the guide path in order to permit the required rolling or sliding movement of the coupling body along the guide path of the transmission element.

The main embodiment is also configured so that the coupling body acts as a coupling element between the two transmission elements. For this purpose, the coupling body is arranged in a recess of one of the transmission elements and drives the other transmission element in a positive engagement via the driver device. The construction of the driver device, which is preferably provided on the driven-side transmission element will be discussed below.

In another embodiment of the invention, the guide path of the transmission element as well as of the rolling or sliding region of the coupling body is circular, since a circular construction is substantially simpler to produce in terms of manufacturing technique than a curvature constructed in any other manner.

In yet a further embodiment of the invention, the coupling bodies are combined with an overload protection acting in the rotating direction in that the coupling body can be transferred to a recess adjacent to it in the rotating direction via a radial passage space in the event of excessive torsional vibration. Although this results in a change in the initial relative position of the transmission elements relative to one another, this change can often be tolerated in torsional vibration dampers.

In still a further embodiment, a mass is arranged in the extension area of the transmission element of the driver device and is assigned to the coupling body. Thus, the moment of inertia which the torsional vibration damper offers in opposition to an introduced torsional vibration is further increased. Torsional vibrations occurring on the drive side can accordingly be opposed in an improved manner.

In another embodiment of the invention, the guide path extends in the circumferential direction on both sides of the curvature location at the maximum distance from the axis of rotation. The two extension parts on the guide path differ from one another with respect to geometrical shape and/or dimensions. It is also possible to construct the material cut out portion of the driver device as a curvature. With these embodiments, the torsional vibration damper has a different damping response during pull operation than it does during push operation. On the other hand, when the width of the material cut out portion of the driver device is greater than the outer dimensioning of the projection or mass in the extension direction of the width, or when the curvature location having the maximum distance from the rotational axis has a radius of curvature tending toward infinity along a predeterminable distance, a response can be achieved whereby the drive-side transmission element of the torsional vibration damper, depending on push or pull operation, can be deflected around its rest position with a predeterminable play relative to the other transmission element without damping and the desired damping is initiated only after this play is overcome. Furthermore, for the purpose of influencing the damping response, whereby a determined damping can be associated with any optional degree of deflection, in another embodiment of the invention the curvature path, proceeding from the curvature location at the maximum distance from the axis of rotation, has a plurality of successive curvatures of different geometrical shape and/or dimensions, and at least one of these curvatures has a radius tending toward infinity.

Yet another embodiment of the invention provides that the guide path is formed in a hub disk or in at least one cover plate. The hub disk or the cover plate act as a drive-side transmission element and serve to receive friction linings and is connected with a driver device via the coupling body. If the guide path is formed in the hub disk, the hub disk is provided with a cover plate that acts as a driven-side transmission element. If the guide path is formed in the cover plate, the driver device is provided at a hub disk which acts as a driven-side transmission element. These embodiments describe the application of the invention to a conventional clutch disk carrying friction linings. This clutch disk has an extremely narrow construction axially, which is explained by the fact that springs which extend in the circumferential direction are conventionally used in such clutch disks as coupling elements between the drive-side transmission element and the driven-side transmission element, wherein these springs, which are constructed as helical springs, have a substantially greater diameter than the coupling bodies according to the invention which are preferably disk-shaped. Further, in order to achieve the desired damping characteristics, a pre-damper is often used at clutch disks of this type, which pre-damper is chiefly provided for idling operation, that is, for small torques. A pre-damper of this kind can be omitted in the clutch disk according to the invention, since an effect comparable to a pre-damper can be realized in the driver device by means of suitable shaping of the guide path and/or removal of material at the material cut out portion. For example, the region of the guide path into which the coupling body is pushed due to centrifugal force without transmission of torque or with the introduction of only a small torque can be constructed with a very flat curvature so that the damping behavior is comparable to a pre-damper with very soft springs. Higher torques, on the other hand, cause a greater relative deflection between the two transmission elements so that the coupling body is pushed out of its position described above and, because of the configuration of the material cut out portion, is forced substantially radially inward into this direction. Thus, the effect is that of an increasing spring rigidity as the transmitted torque increases and accordingly as the deflection of the coupling body increases.

The limiting of such a deflecting movement of the coupling body in the guide path can be effected by means of the circumferential end of the guide path associated with this movement direction. However, in accordance with a further embodiment, this can also be effected by means of spacers, which are usually provided on clutch disks in any case, when these spacers stop against ends of the free-angle or clearance angle path receiving the spacers, which ends serve as stops. Depending on the dimensioning of this clearance angle path, the stops are already advanced appreciably before or just before the coupling body reaches the circumferential end of the guide path.

In the event that such spacers or such clearance angle paths receiving such spacers are not provided for reasons relating to construction, it is also possible in accordance with a further embodiment of the invention to use the circumferential end of the material cut out portions as stops for the coupling bodies. However, this presupposes a corresponding construction of the coupling bodies and of the ends of the material cut out portions, e.g., by means of a suitably tough and strong material, since a rolling movement along the guide path is often superimposed on the movement of the coupling body in the circumferential direction when these ends are reached, which favors a grinding process when the ends are reached. However, corresponding wear can be avoided by suitable selection of material.

In yet another embodiment of the invention the individual material cut out portions merge into one another by connections. Each of the individual connections represents a reversal point between each two material cut out portions which reaches the maximum radial approximation or nearness to the axis of rotation. This provides a guide path in which the coupling bodies, assuming correspondingly large torsional vibrations, can be changed from one material cut out portion to the next after passing through the respective connection. The guide path accordingly acts like a slip clutch so that torque peaks on the drive side are conveyed to the driven side only after being reduced.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
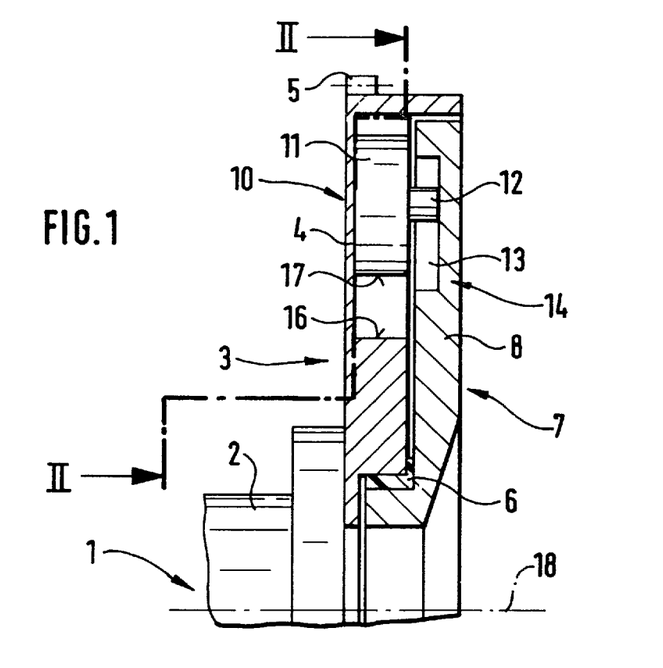
FIG. 1 is a longitudinal section through a half-view of the torsional vibration damper with a coupling body received in a recess of the drive-side transmission element, which coupling body is received in a stationary manner in a radial material cut out portion of a driven-side transmission element in the circumferential direction.

FIG. 1 is a schematic view of a torsional vibration damper in the form of a two-mass flywheel. A transmission element 3 on the drive side which is formed by a first flywheel mass 4, is fastened, in a manner not shown in more detail to a drive 1 in the form of a crankshaft 2. A toothed rim 5, which engages with the teeth of a not illustrated starter pinion, is provided at the radial outer end of the drive-side transmission element 3. At the radial inner end, the drive-side transmission element 3 receives a bearing 6 which in turn carries a driven-side transmission element 7 in the form of a second flywheel mass 8. A recess 9 is provided at the drive-side transmission element 3 and receives a cylindrical coupling body 11 that acts as a coupling element 10. The coupling body 11 is movable by its rolling or sliding region 17 along a guide path 16 of the recess 9. The coupling body 11 has a projection 12 at its side facing the driven-side transmission element 7. The projection 12 engages in a material cut out portion 13 of the driven-side transmission element 7. The material cut out portion 13 extends substantially in the radial direction with reference to an axis of rotation 18 of the torsional vibration damper and enables the coupling body 11 to carry out a radial movement whose extent is defined by the extent of the material cut out portion 13. On the other hand, the material cut out portion 13 is limited in the circumferential direction only to the diameter of the projection 12 which preferably has a circular cross section, so that movement of the coupling body 11 introduced in the circumferential direction causes the driven-side transmission element 7 to be carried along. A driver device 14 for the driven-side transmission element 7 is formed by the projection 12 in connection with the material cut out portion 13.

The device functions so that when a torsional vibration is introduced at the crankshaft 2, the drive-side transmission element 3 executes a cyclic irregularity which in turn results in a deflection of the coupling body 11 in the opposite rotating direction. The extent of the deflection of the coupling body 11 depends on the magnitude of the torsional vibration as well as on the speed of the torsional vibration damper, since the centrifugal force increases as the speed increases and, accordingly, the contact pressure of the coupling body 11 against the curvature location of the guide path 16 which has the greatest distance from the rotational axis 18 is extremely high as is, accordingly, the inertia which the coupling body 11 sets in opposition to a deflection under the influence of a torsional vibration. Conversely, at a very low speed, the introduction of a torsional vibration leads very easily to a deflection of the coupling body 11 from this curvature location. The coupling body 11 accordingly also acts as a speed-independent compensator.

The deflection of the coupling body 11 from the curvature location of the guide path 16 is likewise effected when the torque present at the drive-side transmission element 3 is transmitted to the driven-side transmission element 7 via the coupling body 11, wherein the extent of deflection of the coupling body 11 depends to a great extent on the magnitude of this torque. In this connection, an increase in torque causes, by way of the deflection of the coupling body 11 in the material cut out portion 13, the coupling body 11 to be drawn radially inward against the action of centrifugal force until a force equilibrium is adjusted. The guide path 16 and/or the material cut out portion 13 can preferably be configured so that small deflections from the center curvature location are effected against relatively slight resistance, while increasing deflection resistance builds up as the extent of deflection increases. A limiting of the extent of deflection is produced by the guide path 16 when the coupling body 11 comes into contact with one of the ends on the circumferential side.

Due to the fixing of the projection 12 of the coupling body 11 in the material cut out portion 13 of the driven-side transmission element 7, a deflection of the coupling body 11 is transmitted directly to the driven-side transmission element 7, so that this transmission element 7 is moved in the direction opposite to the deflecting direction of the drive-side transmission element 3. However, the torsional vibration arriving at the driven-side transmission element 7 is considerably reduced by the torsional vibration damper compared to its state when introduced at the crankshaft 2.

A conventional friction clutch, by means of which a gear unit arranged subsequent to the torsional vibration damper can be coupled or uncoupled, is attached to the side of the driven-side transmission element 7 remote of the coupling body 11 in a conventional manner which is therefore not described here.

Figure 2:
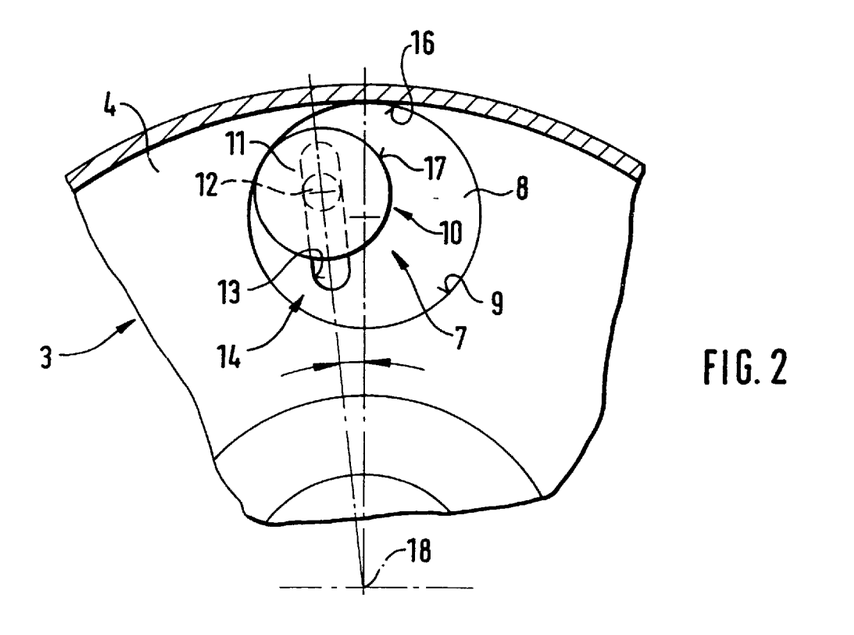
FIG. 2 is a view along the line II—II in FIG. 1, with a guide path for the coupling body.
Figure 3:
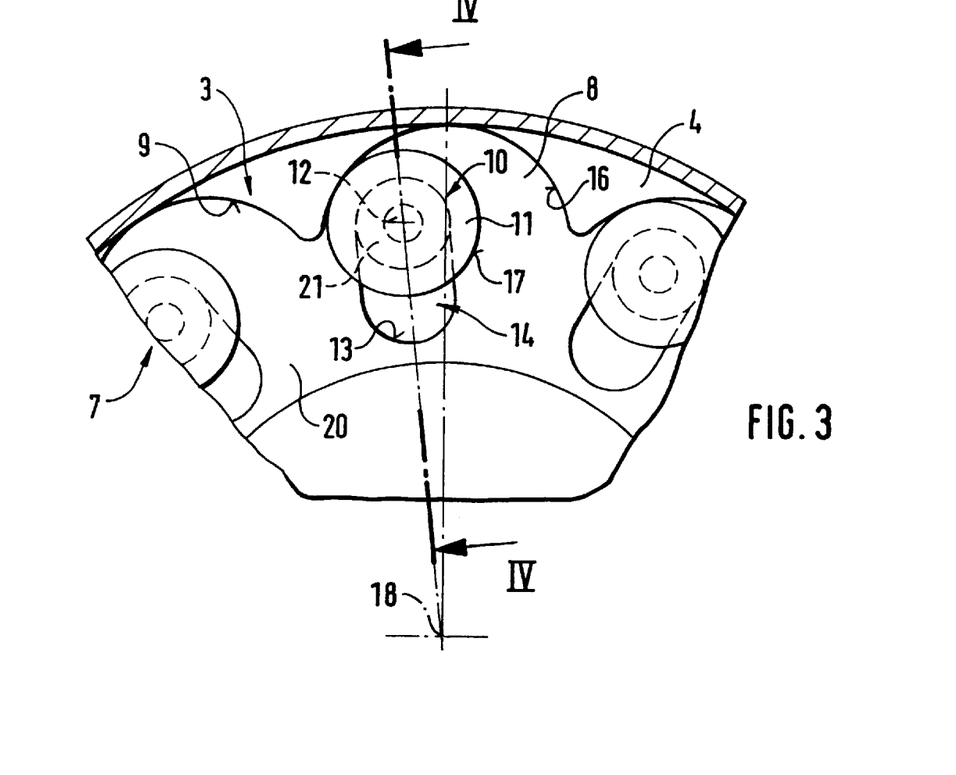
FIG. 3 corresponds to FIG. 2, but with a plurality of recesses, each for a coupling body.

The embodiment of the torsional vibration damper shown in FIG. 3 differs from that shown in FIG. 1 or FIG. 2 in that, viewed in the circumferential direction, a plurality of recesses 9a are provided with a coupling body 11a in each instance. The recesses are not, however, formed circularly, but merely extend along a circle segment region and leave open, radially inward toward the respective adjacent recess 9a00, a radial passage space 20 which is greater than the outer diameter of the coupling bodies 11a. It is accordingly possible for these coupling bodies 11a to change over into the respective adjacent recess 9a during a rolling movement under the influence of a torsional vibration, especially at low speed at the torsional vibration damper and consequently at low centrifugal force via the radial passage space 20, so that this construction offers overload protection against excessive introduced torsional vibrations, since, after all of the coupling bodies 11a jump over into the respective adjacent recess 9a, the torsional vibration damper continues to function in the manner described above. There are also no problems associated with the acceleration of the torsional vibration damper from a standstill, since only one coupling body can dip into each recess 9a in each instance and a recess 9a is prevented from being simultaneously occupied by two coupling bodies 11a.

Figure 4:
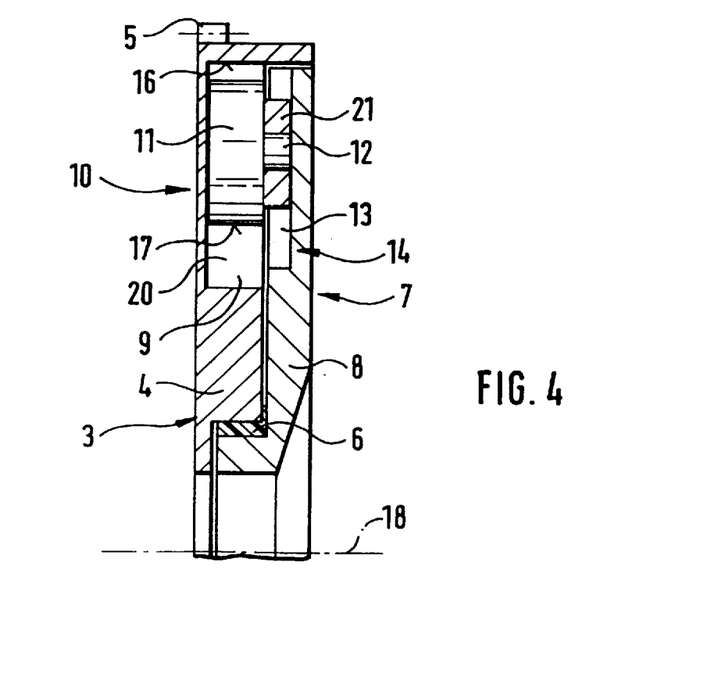
FIG. 4 is a section through the torsional vibration damper of FIG. 3 along the line IV—IV.

As is shown with reference to FIG. 3, the moment of inertia of the torsional vibration damper can be further increased when an additional mass 21 is provided on the projection 12a engaging in the material cut out portion 13a of the driver device 14a, as is shown in FIG. 4. This additional mass 21 can be received in a material cut out portion 13a which is correspondingly widened in the circumferential direction, so that the additional mass 21 will not alter the functioning of the torsional vibration damper according to the invention. On the other hand, a development of a torsional vibration at the drive side will be opposed more forcefully than in the construction according to FIG. 1.

Figure 5:
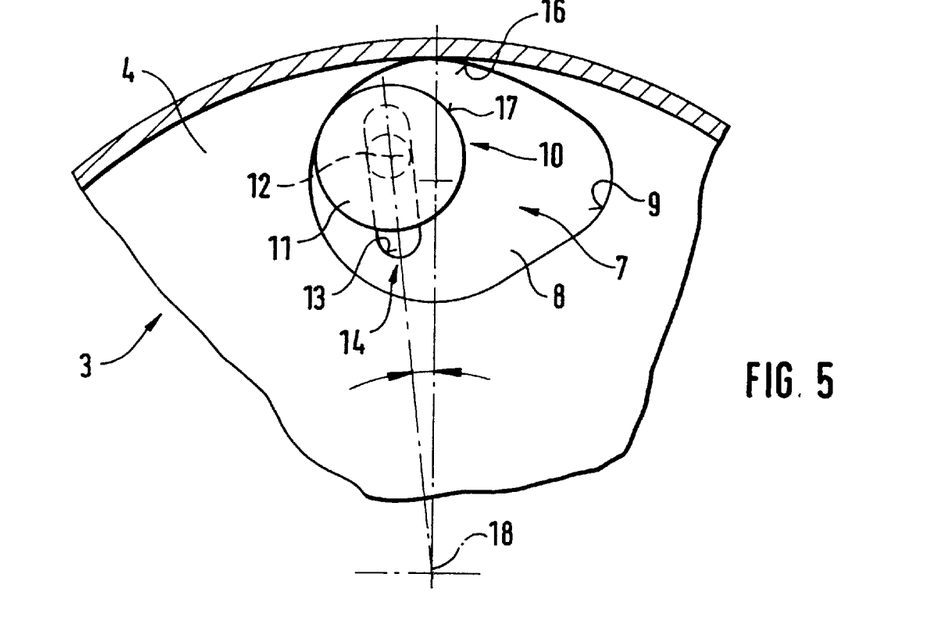
FIG. 5 corresponds to FIG. 2, but with an asymmetrical configuration of the guide path.
Figure 6:
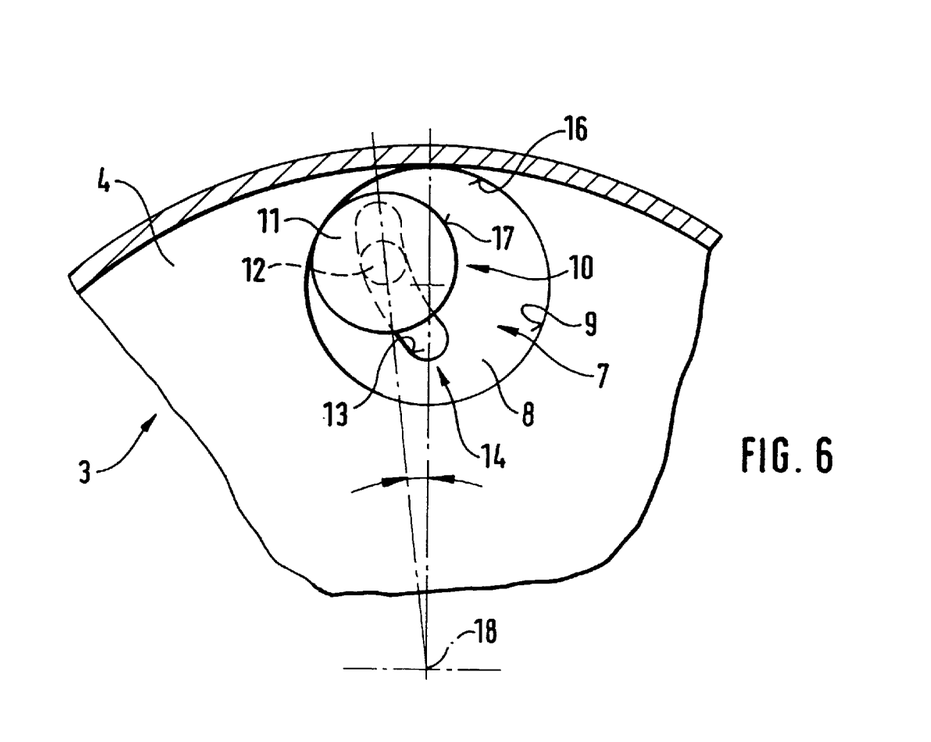
FIG. 6 corresponds to FIG. 2, but with a curved driver device for the coupling body.

In FIG. 5, the guide path 16b is constructed asymmetrically relative to the guide path 16a shown in FIG. 2 proceeding from the curvature location at the greatest radial distance from the axis of rotation 18, wherein the curvature is more pronounced on the left-hand side of this curvature location than on the right-hand side. Accordingly, the torsional vibration damper has a different damping behavior in the pulling direction than in the pushing direction. The curved construction of the material cut out portion 13c of the driver device 14c, as is shown in FIG. 6, serves the same purpose as the asymmetric guide path 16b in FIG. 5.

Figure 7:
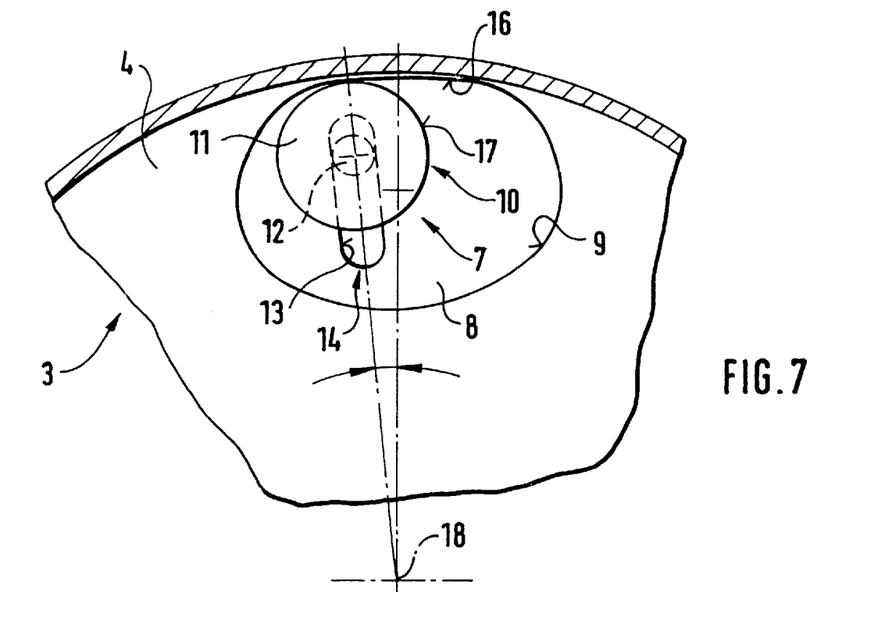
FIG. 7 corresponds to FIG. 5, but with a straight-line extension of the curvature location formed at the maximum distance from the axis of rotation.
Figure 8:
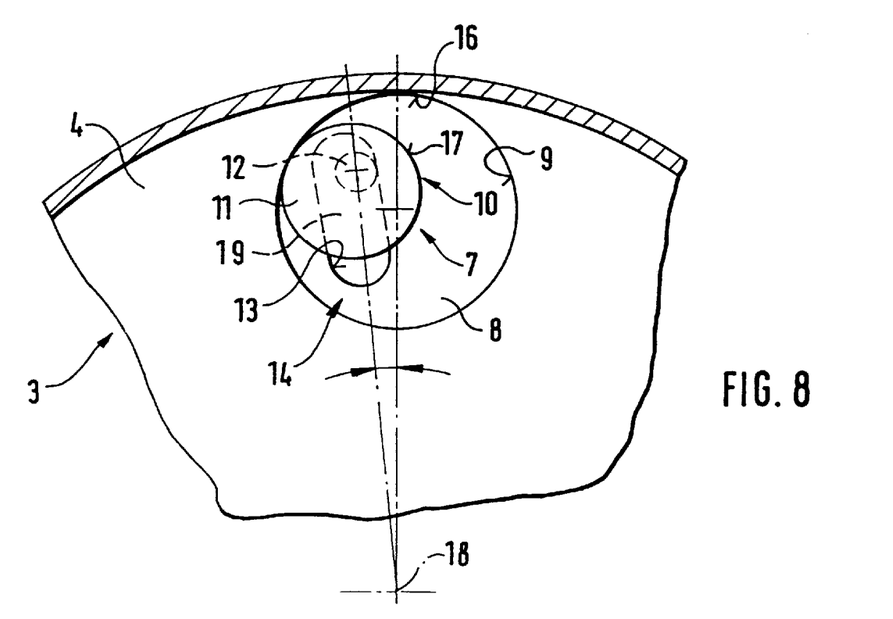
FIG. 8 is a view corresponding to FIG. 2 in which, however, the driver device for the coupling body is constructed so as to be wider in the circumferential direction.

According to FIG. 7, in the region of the curvature location at the greatest radial distance from the axis of rotation 18, the guide path 16d forms a straight line or a substantially straight line, so that small pendulum movements of the two transmission elements 3, 7 relative to one another need not take place with a radial component directed opposite to the action of centrifugal force. Consequently, the transmission elements 3, 7 have, proceeding from a defined center position, a small available amount of play in both deflection directions before the curved path turns radially inward and a damping action is accordingly achieved as soon as the coupling body 11 is forced radially inward on the guide path 16d. A play of the two flywheel masses relative to one another is also made possible by the construction according to FIG. 8 in which the material cut out portion 13e of the driver device 14e has a greater width 19 in the circumferential direction than the projection 12. This solution is also conceivable when the material cut out portion 13e of the driver device 14e receives the mass 21 according to FIGS. 3 and 4 and is constructed so as to be wider than the latter in the circumferential direction.

Figure 9:
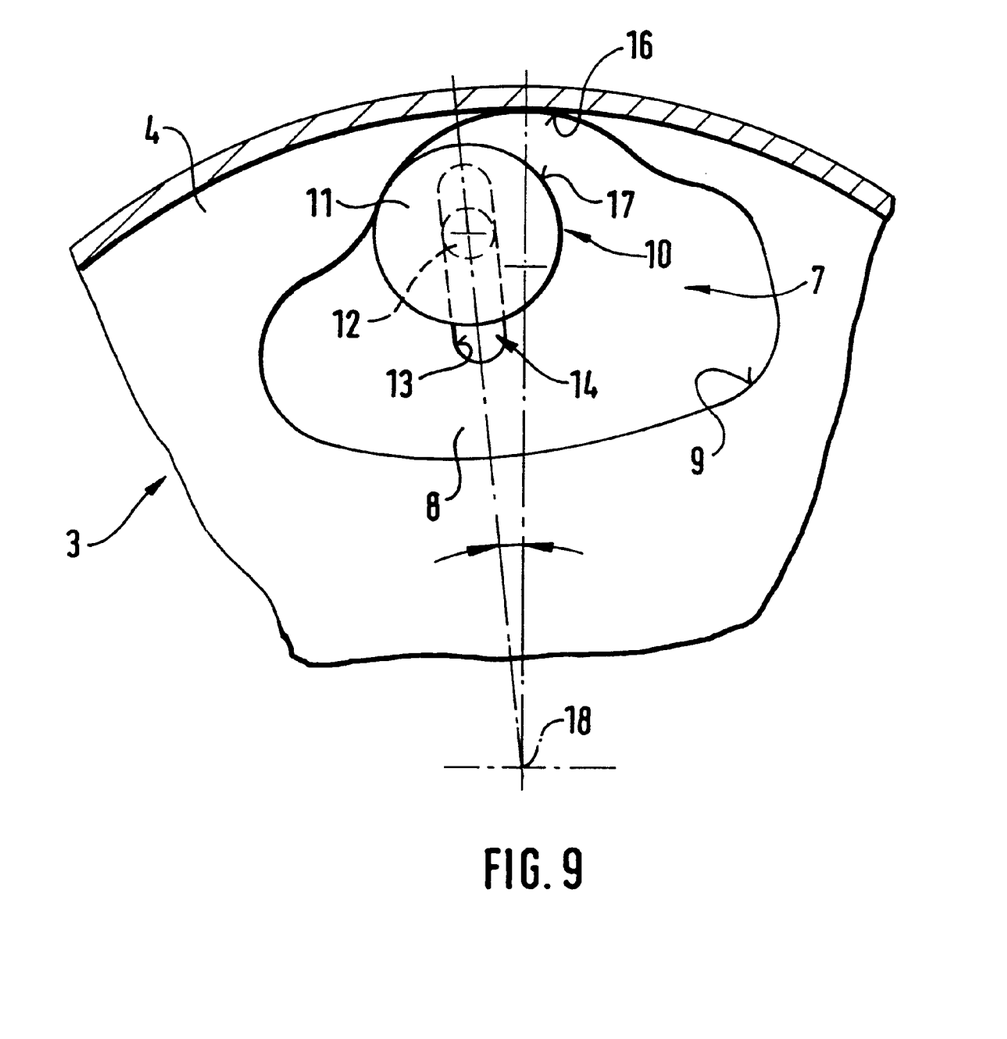
FIG. 9 corresponds to FIG. 5, but with a succession of curvatures of varying degrees of curvature at the curvature path.

FIG. 9 shows a guide path 16f with a plurality of successive curves, at least one of which can have a radius of curvature which tends toward infinity. As a result of the plurality of curves, it is possible, when the two transmission elements 3 and 7 are deflected relative to one another, to achieve a damping behavior in which a determined damping is associated with each extent of deflection.

While the constructions of the torsional vibration damper described thus far have been based on a two-mass flywheel, a clutch disk 34 is provided in FIGS. 10 to 13. According to FIGS. 10 and 11, the clutch disk 34 has two cover plates 27 that serve as the drive-side transmission element 3 and a hub disk 26 formed with a hub 25 as the driven-side transmission element 7. The hub disk 26 is arranged axially between the two cover plates 27. The plates 27 are connected with one another by spacers 22 (FIG. 10) so as to be fixed with respect to rotation relative to one another. The relative angle between the drive-side transmission element 3 and the driven-side transmission element 7 can be limited by these spacers 22 which are guided in clearance angle paths 28 of the hub disk 26. In this respect, the circumference-side ends of every clearance angle path 28 act as stops 30 for the associated spacer 22.

Figure 10:
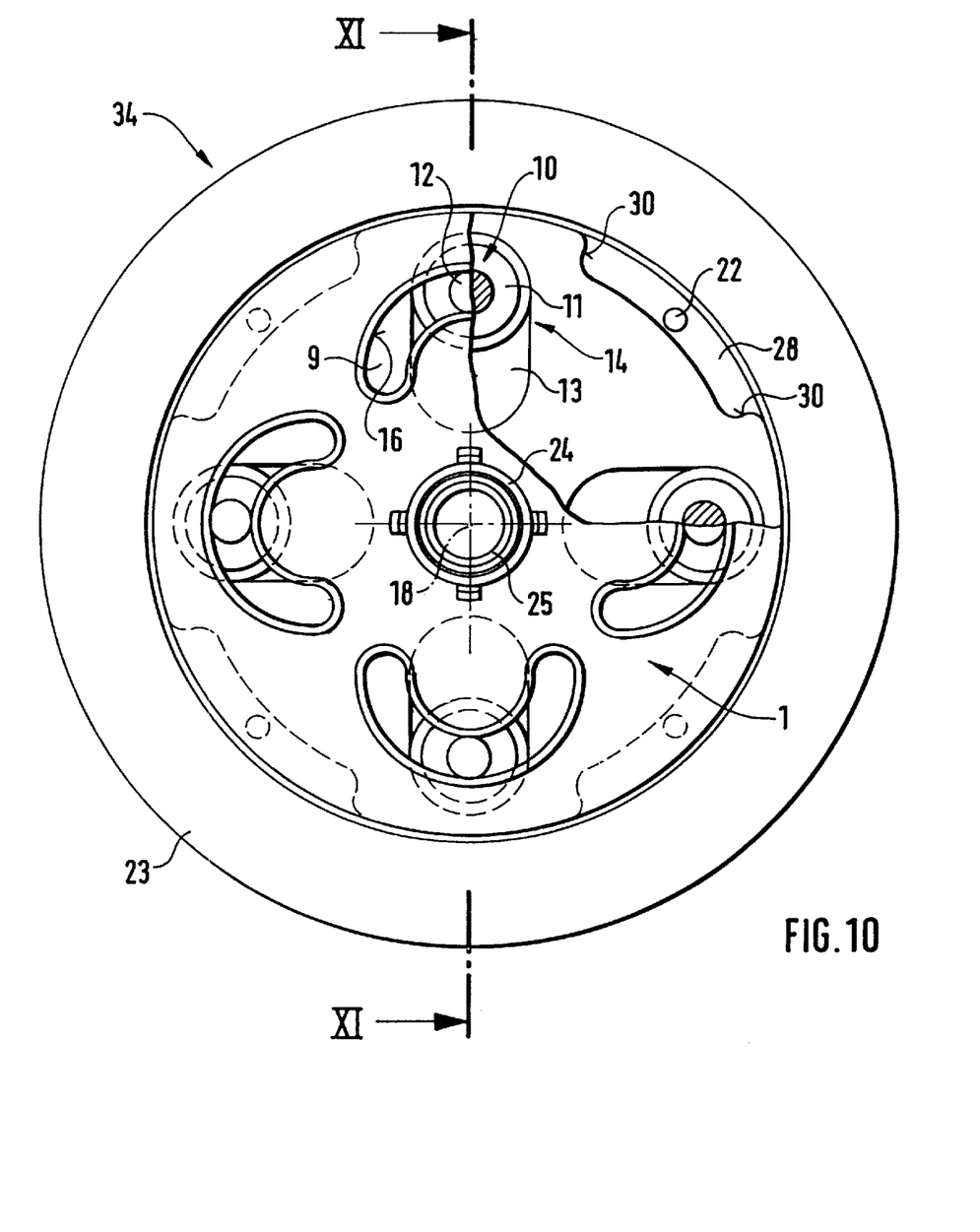
FIG. 10 is a top view of a torsional vibration damper in the form of a clutch disk with a sectional view along an angle of 90°.
Figure 11:
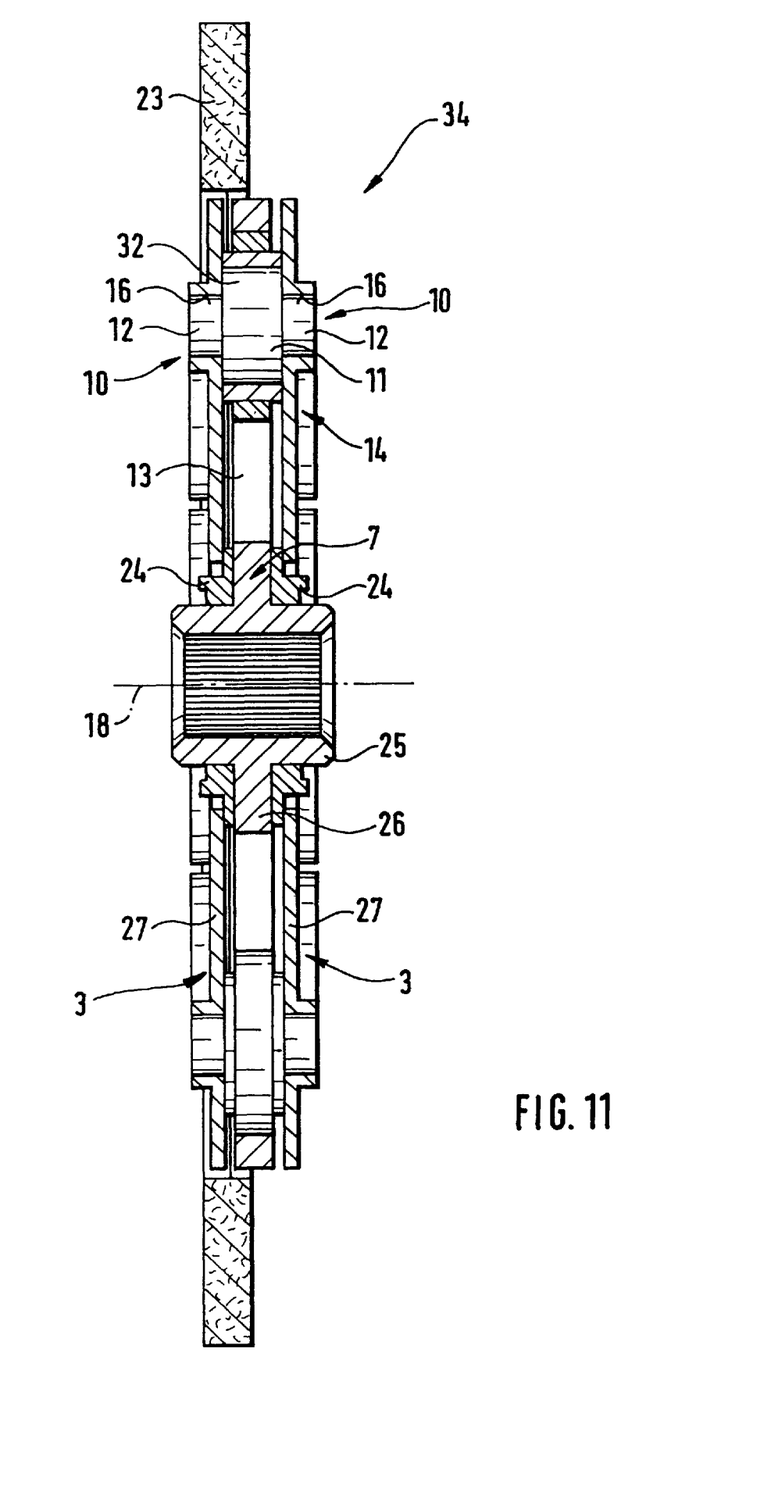
FIG. 11 is a sectional view along line XI—XI in FIG. 10.

In the two cover plates 27, the curved guide paths 16g are formed in which the coupling bodies 11g are guided as the coupling element 10g. The coupling bodies 11g are connected with one another by an intermediate roller 32 which corresponds to the projection 12 in the preceding embodiments and is guided in a material cut out portion 13g which extends substantially radially. As has already been discussed in the previously described embodiments, when a torsional vibration and/or torque is introduced from the drive-side transmission element 3 and therefore from the cover plates 27, the coupling body 11g is compulsorily deflected from a position in which it was adjusted as a result of centrifugal force, namely, according to FIG. 10, from a center position of the guide path 16g. Due to the radial inward curvature of the guide path 16g, the intermediate roller 32 is compelled radially inward as the deflection of the coupling body 11g increases. The hub disk 26 transmits the introduced torsional vibration in a correspondingly damped manner to the gearshaft, not shown, via the hub 25 with which the gearshaft is connected so as to be fixed with respect to rotation relative to it.

As in previously known clutch disks, for example, the clutch disk known from the German reference P 44 09 694 A1, the introduction of torque is effected from a flywheel mass acting on one side of friction linings 23 as soon as the friction linings 23 are held in a frictional engagement axially between this flywheel mass and a contact pressing plate which is received in a clutch housing that is fixed with respect to rotation relative to the flywheel mass and is loaded by a contact pressure spring such as a diaphragm spring. Since a friction clutch of this type is shown and described in its entirety in the above-cited German reference 44 09 694 A1, and is generally known in the art, a further description will be dispensed with here. Therefore, only the construction of the coupling elements 10g according to the invention was discussed in detail.

It should be mentioned that the cover plates 27 are mounted on the hub 25 via a bearing ring 24 which could be constructed conically. The clutch disk 34 according to the invention can be provided in a known manner with a base friction device and/or a play type friction device.

Figure 12:
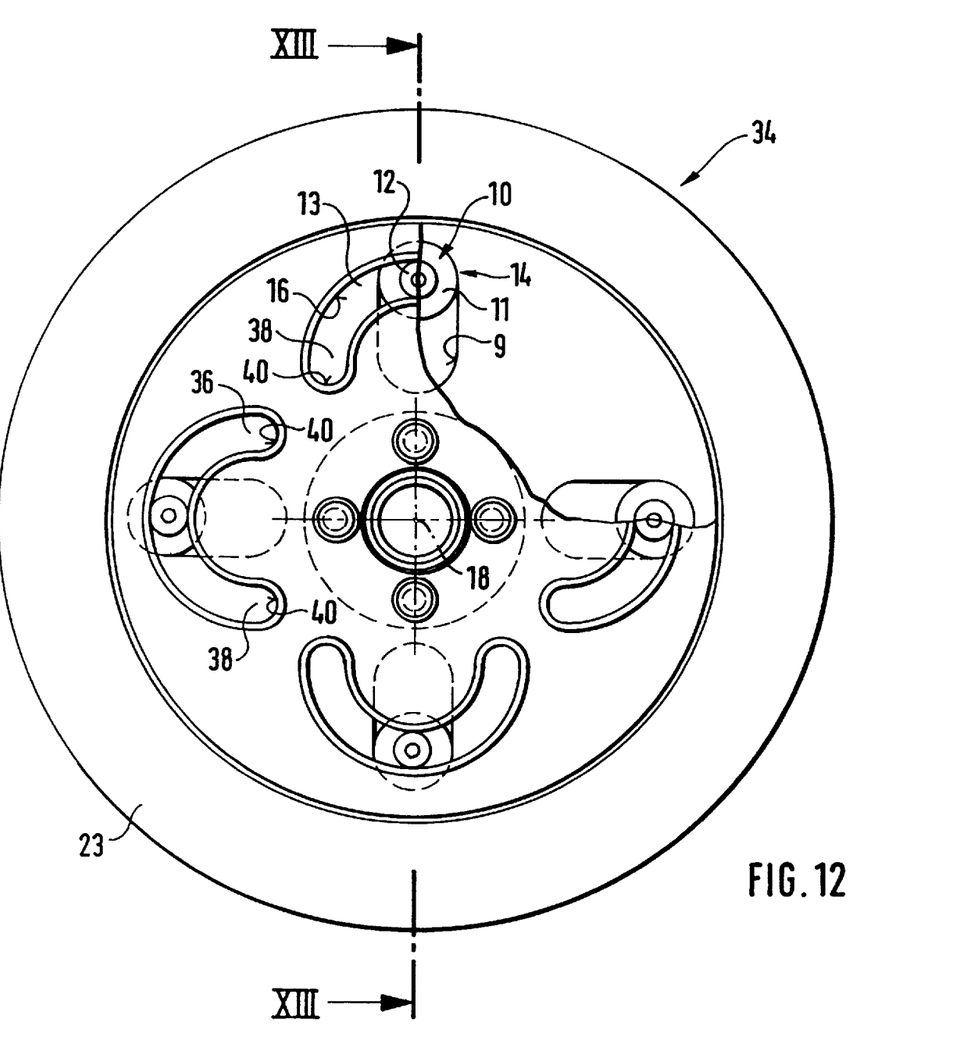
FIG. 12 corresponds to FIG. 10, but with a reversal of action from the drive-side transmission element to the driven-side transmission element.
Figure 13:
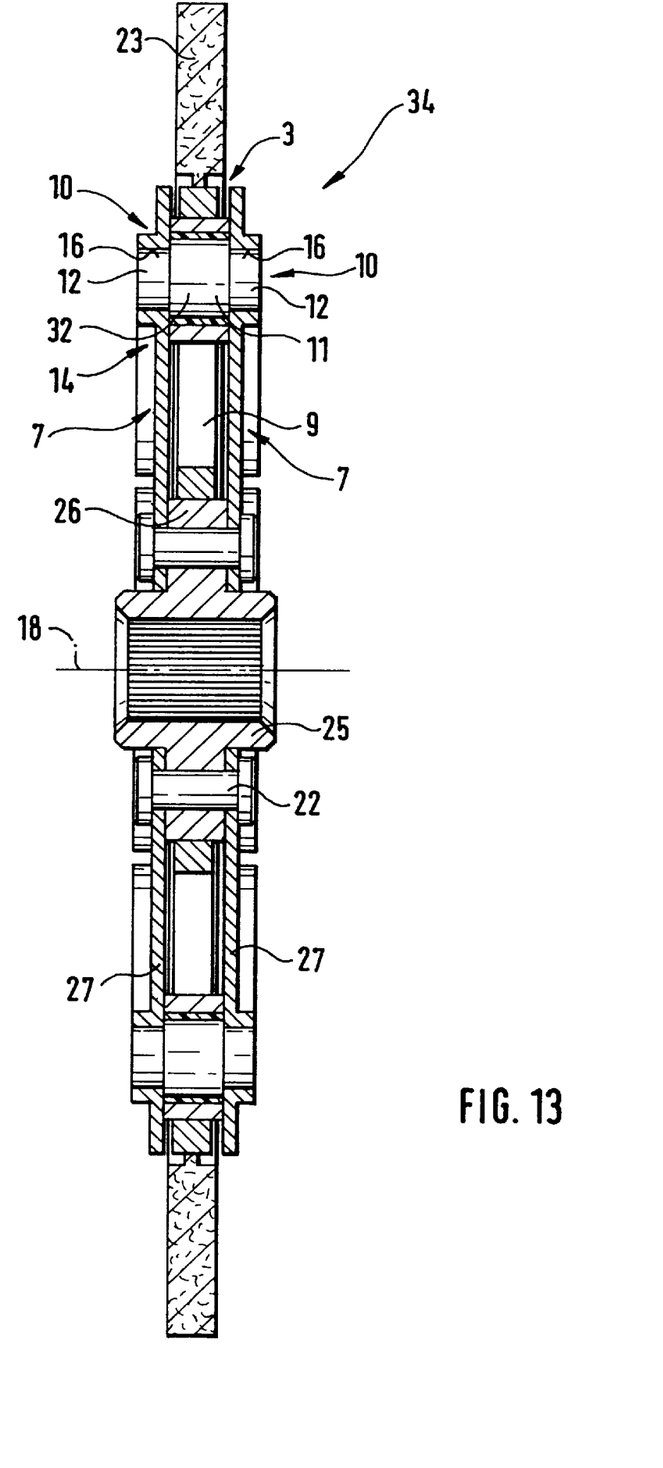
FIG. 13 shows a sectional view along line XIII—XIII in FIG. 12.

FIGS. 12 and 13 show a clutch disk 34 in which the friction linings 23 are fastened to the hub disk 26 which accordingly acts as the drive-side transmission element 3. On the other hand, the cover plates 27 arranged on both sides of the hub disk 26 act as the driven-side transmission element 7 and are connected with one another so as to be fixed with respect to rotation relative to one another by the spacers 22. In this clutch disk 34, the guide path 16g for the coupling body 11g is formed in the hub disk 26, wherein the projections 12g proceed from the coupling body 11g on both sides and extend in the corresponding material cut out portion 13g on each of the cover plates 27. Apart from the exchange of functions between the individual elements, as far as which of the elements acts as drive-side transmission element or driven-side transmission element, this clutch disk 34 also corresponds, with respect to its manner of operation, to the torsional vibration damper described above in connection with FIGS. 10 and 11.

It should also be noted that every material cut out portion 13g has two ends 36, 38 on the circumferential side which, given corresponding degrees of deflection of the two transmission elements 3, 7 relative to one another, act as stops 40 in the respective deflecting direction.

Figure 14:
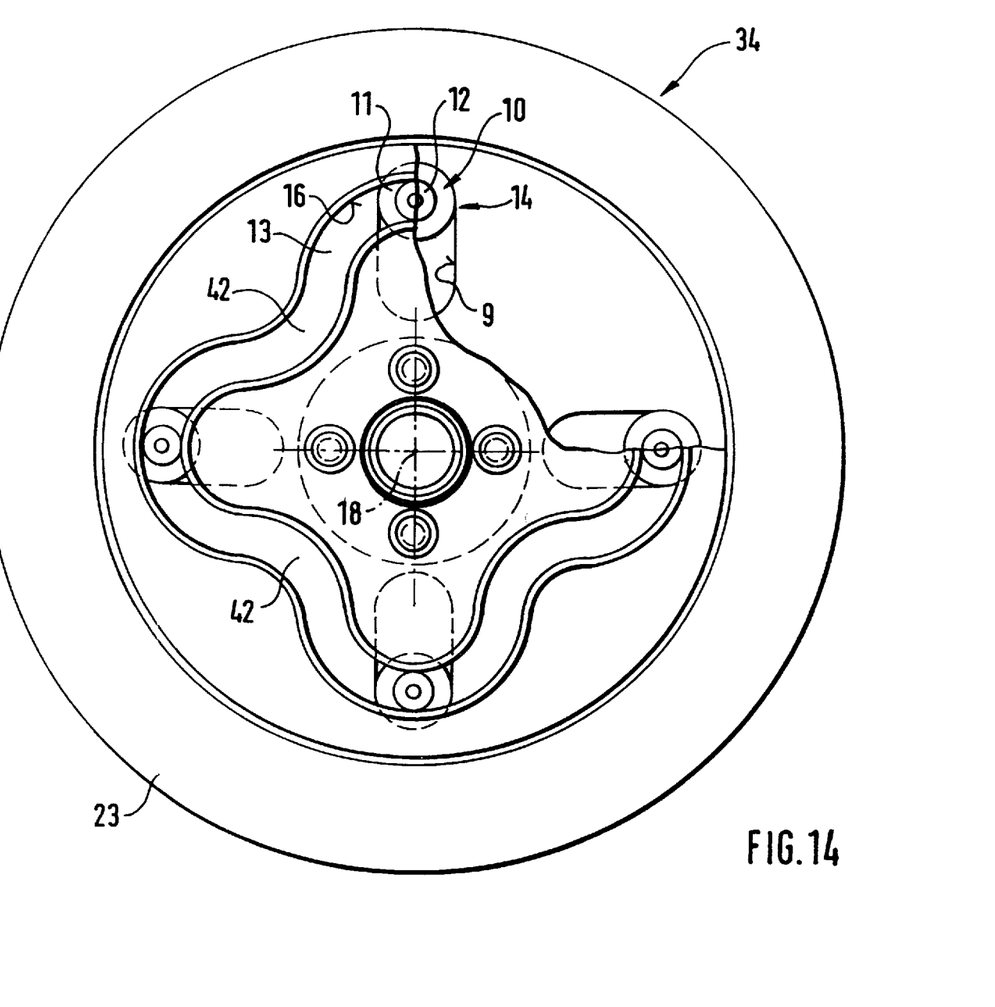
FIG. 14 corresponds to FIG. 12, but with connections between the individual guide paths.

FIG. 14 shows yet another embodiment in which two material cut out portions 13h pass into one another by means of a connection 42. According to FIG. 14, the connection 42 is designed so that it forms the reversal point of the curvature which most closely approaches the axis of rotation 18 radially with reference to the curvature configuration of the guide path 16h. When an overload is introduced, the individual coupling bodies 11 are pressed out of the material cut out portion 13h in which they are arranged into the next material cut out portion 13h via the connection 42. Accordingly, the entire system takes on the function of a slip clutch as a result of the connections 42, so that torque peaks at the drivetrain are not transmitted to the driven side.

The invention is not limited by the embodiments described above which are presented as examples only but can be modified in various ways within the scope of protection defined by the appended patent claims.

We claim:

1. A torsional vibration damper, comprising:
   a drive-side transmission element;
   a driven-side transmission element;
   a damping device arranged so as to transmit torque between the transmission elements, the driven-side transmission element being rotatable about an axis of rotation relative to the drive-side transmission element against action of the damping device, the damping device including at least one coupling body that moves along at least one guide path formed in one of the transmission elements, the guide path being configured to have a curvature with a location along the curvature at a maximum distance from the axis of rotation, the coupling body being displaceable in a circumferential direction, in working connection with the other transmission element, and having a rolling region with a curvature that faces the guide path, and
   a driver device provided to connect the coupling body with the other transmission element, whereby deflection of the one transmission element in a circumferential direction by relative movement of the coupling body results in a deflection of the other transmission element, the driver device having a material cut out portion, the coupling body having a projection that extends toward the transmission element having the driver device and engages in the cut out portion of the driver device so as to be guided by the cut out portion so that the cut out portion allows the coupling body to move in a sustantially radial direction, and enables a maximum movement in the circumferential direction with a predeterminable angle.

2. A torsional vibration damper according to claim 1, wherein the coupling body is configured to have a curvature that is greater than the curvature of the guide path.

3. A torsional vibration damper according to claim 1, wherein the guide path and the coupling body are configured to have a circular curvature at least within a mutual contact region.

4. A torsional vibration damper according to claim 1, wherein the recess forms the guide path, the guide path and the rolling region of the coupling body are provided radially outside relative to the axis of rotation.

5. A torsional vibration damper according to claim 1, wherein a plurality of adjacent recesses are provided along a circumference of the transmission element carrying the at least one coupling body, each of the recesses defining a guide path, a respective coupling body being arranged in each recess.

6. A torsional vibration damper according to claim 5, wherein a radial passage space is formed between the two recesses and is larger than the coupling bodies.

7. A torsional vibration damper according to claim 1, and further comprising a mass mounted to the coupling body and arranged in an extension area of the transmission element carrying the driver device.

8. A torsional vibration damper according to claim 7, wherein the mass is arranged so as to engage in the material cut out portion of the driver device.

9. A torsional vibration damper according to claim 7, wherein the material cut out portion of the driver device is configured to have a width that is greater than an outer dimensioning of the mass in an extension direction of the width.

10. A torsional vibration damper according to claim 1, wherein the guide path is configured to extend circumferentially on both sides of the curvature location at the maximum distance from the axis of rotation.

11. A torsional vibration damper according to claim 10, wherein the guide path extensions are configured to differ from one another with respect to at least one of geometrical shape and dimensions.

12. A torsional vibration damper according to claim 1, wherein the material cut out portion of the driver device is configured to have a width that is greater than an outer dimensioning of the projection in an extension direction of the width.

13. A torsional vibration damper according to claim 1, wherein the material cut out portion of the driver device is formed with a curvature.

14. A torsional vibration damper according to claim 1, wherein the guide path is formed so that the curvature location having the maximum distance from the rotational axis has a radius of curvature tending toward infinity along a predeterminable distance.

15. A torsional vibration damper according to claim 1, wherein the curvature path, proceeding from the curvature location at the maximum distance from the axis of rotation, is configured to have a plurality of successive curvatures of at least one of different geometrical shape and different dimensions.

16. A torsional vibration damper according to claim 15, wherein the curvature path is configured so that at least one of the curvatures has a radius tending toward infinity.

17. A torsional vibration damper according to claim 1, wherein the drive-side transmission element is at least one cover plate in which the guide path is formed, the driven-side transmission element being a hub disk, the cover plate being connected to the driver device by the coupling body, the driver device being provided at the disk hub, and further comprising friction linings mounted on the cover plate.

18. A torsional vibration damper according to claim 17, wherein a cover plate is provided on each side of the hub disk, the hub disk having a plurality of clearance angle paths, and further comprising axial spacers that hold together the cover plates so as to rotatably fixed relative to one another, the spacers engaging in the clearance angle paths of the hub disk so as to be guided with play circumferentially, ends of the paths acting as stops that define an extent of deflection of the coupling body in the guide path.

19. A torsional vibration damper according to claim 1, herein the drive-side transmission element is a hub disk in which the guide path is formed, and further comprising friction linings mounted on the hub disk, the driven-side transmission element being a cover plate, the hub disk being connected with the driver device by the coupling body, the driver device being provided at the cover plate.

20. A torsional vibration damper according to claim 19, wherein the material cut out portion has circumferential-side ends that act as stops for the coupling body and define an extent of deflection of the transmission elements relative to one another.

21. A torsional vibration damper according to claim 1, wherein the individual material cut out portions and the guide paths merge into one another with connections.

22. A torsional vibration damper according to claim 21, wherein each of the connections is formed as a reversal point between two material cut out portions and reaches a maximum radial nearness to the axis of rotation.

* * * * *